United States Patent
Wan et al.

(10) Patent No.: US 7,301,936 B2
(45) Date of Patent: Nov. 27, 2007

(54) RING OVERLAY NETWORK DEDICATED TO CARRY BROADCAST TRAFFIC TO DSLAMS

(75) Inventors: Albert Chungbor Wan, Austin, TX (US); Ahmad C. Ansari, Austin, TX (US); David Bruce Hartman, Austin, TX (US); Mehrad Yasrebi, Austin, TX (US)

(73) Assignee: SBC Knowledge Ventures, L.P., Reno, NV (US)

( * ) Notice: Subject to any disclaimer, the term of this patent is extended or adjusted under 35 U.S.C. 154(b) by 520 days.

(21) Appl. No.: 10/606,160

(22) Filed: Jun. 25, 2003

(65) Prior Publication Data

US 2004/0264440 A1 Dec. 30, 2004

(51) Int. Cl.
*H04L 12/66* (2006.01)
(52) U.S. Cl. ............... 370/352; 370/353; 370/401; 370/902; 709/238; 709/245
(58) Field of Classification Search ............... 370/352, 370/432, 390, 328, 338, 901, 902, 353, 401; 709/238, 204, 245, 223, 203; 725/148, 118, 725/109, 129; 348/384.1
See application file for complete search history.

(56) References Cited

U.S. PATENT DOCUMENTS

| | | | |
|---|---|---|---|
| 5,048,081 A | 9/1991 | Gavaras et al. | |
| 5,369,696 A | 11/1994 | Krauss et al. | |
| 5,602,909 A | 2/1997 | Carkner et al. | |
| 5,610,977 A | 3/1997 | Williams et al. | |
| 5,764,754 A | 6/1998 | Ortel et al. | |
| 5,768,358 A | 6/1998 | Venier et al. | |
| 5,903,731 A | 5/1999 | Vincent et al. | |
| 5,915,009 A | 6/1999 | Williams et al. | |
| 5,918,213 A | 6/1999 | Bernard et al. | |
| 6,002,757 A | 12/1999 | Williams et al. | |
| 6,005,841 A | 12/1999 | Kicklighter | |
| 6,021,194 A | 2/2000 | Begeja et al. | |
| 6,047,055 A | 4/2000 | Carkner et al. | |
| 6,055,243 A | 4/2000 | Vincent et al. | |
| 6,085,255 A | 7/2000 | Vincent et al. | |
| 6,097,801 A | 8/2000 | Williams et al. | |
| 6,118,780 A * | 9/2000 | Dunn et al. | 370/355 |
| 6,192,250 B1 | 2/2001 | Buskens et al. | |
| 6,389,015 B1 | 5/2002 | Huang et al. | |
| 6,718,553 B2 * | 4/2004 | Kenworthy | 725/118 |
| 6,892,233 B1 * | 5/2005 | Christian et al. | 709/223 |
| 6,992,975 B1 * | 1/2006 | Daniel et al. | 370/222 |
| 7,191,332 B1 * | 3/2007 | Pankajakshan et al. | 713/163 |
| 2001/0034627 A1 | 10/2001 | Curtis et al. | 705/7 |
| 2002/0026645 A1 * | 2/2002 | Son et al. | 725/117 |
| 2002/0032766 A1 | 3/2002 | Xu | 709/223 |
| 2002/0032797 A1 | 3/2002 | Xu | 709/238 |
| 2002/0032798 A1 | 3/2002 | Xu | 709/238 |

(Continued)

*Primary Examiner*—Edan Orgad
*Assistant Examiner*—Chuong Ho
(74) *Attorney, Agent, or Firm*—Toler Schaffer LLP

(57) ABSTRACT

A broadcast overlay network has a ring topology to carry broadcast traffic from a head-end network. A digital subscriber line access multiplexer (DSLAM) has a network interface in communication with the broadcast overlay network. The DSLAM is to receive a request for a particular video channel from a customer premise via a line interface and to deliver the particular video channel from the network interface to the line interface.

16 Claims, 6 Drawing Sheets

U.S. PATENT DOCUMENTS

| | | |
|---|---|---|
| 2002/0035639 A1 | 3/2002 | Xu .............................. 709/238 |
| 2002/0038339 A1 | 3/2002 | Xu .............................. 709/203 |
| 2003/0037029 A1 | 2/2003 | Holenstein et al. |
| 2003/0086536 A1 | 5/2003 | Salzberg et al. ......... 379/15.02 |
| 2003/0140353 A1* | 7/2003 | Hugenberg et al. ......... 725/148 |
| 2004/0042433 A1* | 3/2004 | Milbrandt ................... 370/338 |
| 2004/0088735 A1* | 5/2004 | Kristofek .................... 725/118 |
| 2004/0090970 A1* | 5/2004 | Sanchez et al. ............. 370/397 |
| 2004/0117503 A1* | 6/2004 | Nguyen et al. .............. 709/238 |
| 2004/0125818 A1* | 7/2004 | Richardson et al. ........ 370/432 |

\* cited by examiner

RING OVERLAY NETWORK DEDICATED TO CARRY BROADCAST TRAFFIC TO DSLAMS

FIELD OF THE DISCLOSURE

The present disclosure relates to multicast telecommunications.

DESCRIPTION OF THE RELATED ART

FIG. 1 is a simplified view of an Internet Protocol (IP) network 10. The IP network 10 provides access to the Internet 12 for residential users 14 and corporate users 16. IP networks 10 and the Internet 12 were designed such that various network elements such as routers 20, Asynchronous Transfer Mode (ATM) routers 22, switches 24, access devices such as Customer Premises Equipment (CPEs) 26 and 30, and hosts logically communicate using transport data packets in a pair-wise or unicast fashion.

Many Internet access services are offered by telephone companies (telcos) using technologies such as various types of Digital Subscriber Lines (DSL), which are generalized as xDSL. An example of an xDSL is Asymmetric DSL (ADSL). In xDSL, carrier-side access devices are called DSL Access Multiplexers (DSLAMs). DSLAMs perform traffic aggregation, grooming, policing, access multiplexing and other tasks.

FIG. 2 shows placement of DSLAMs in relation to the IP network 10 and the Internet 12. Each of DSLAMs 32, 34, 36 and 40 is linked to one of the router 20 or 22. The DSLAM 32 is disposed at a central office 42. The DSLAMs 34, 36 and 40 are disposed at a central office 44. The DSLAM 32 provides ADSL access to multiple customer premises 46. The DSLAM 34 provides ADSL access to multiple customer premises 50. The DSLAM 36 provides ADSL access to multiple customer premises 52. The DSLAM 40 provides ADSL access to multiple customer premises 54.

CPEs at the customer premises have DSL modems to interface with the DSLAMs to provide access to the Internet 12. Users can perform various Internet applications such as browsing, file transfer, peer-to-peer communication and instant messaging. The aforementioned applications, which involve sending data from a sender to a recipient in a one-to-one unicast relationship, are efficiently performed by the Internet.

The maturity of distributed computing necessitates the need to accommodate non-unicast communication models. An example is broadcast video applications, i.e. applications that are similar in function to terrestrial broadcast video, cable video and satellite video. Such applications require distribution of data from a single source to multiple recipients at multiple destinations. A different approach to network design is needed to efficiently handle multicast applications.

The Internet Engineering Task Force (IETF), which is a loosely-formed Internet-standard-setting organization, has several IP multicast routing protocols that can be used by service providers to emulate broadcast on a unicast-based network. Examples of the protocols include Protocol-Independent Multicast (PIM) sparse mode, PIM dense mode and Multicast Open Shortest Path First (MOSPF). Using these multicast routing protocols, routers and other network elements that understand routing protocols in the unicast network can exchange multicast routing information and form IP multicast distribution trees. However, only the routers that participate in the multicast distribution tree provide the IP multicast data transport.

Depending on the routing protocol that is used, the creation of the multicast distribution tree can be either dynamic or static. The tree-building process comprises routers listening for IGMP join and leave requests from the CPEs, and performing associated tree pruning and grafting processes between routers. IGMP, which stands for Internet Group Management Protocol, is a mechanism used by IP-multicast-capable CPE devices to signal their channel group join/leave interest to a nearest network element. The network element is usually a routing device configured to understand multicast routing protocols and to participate in the multicast routing decisions as described above.

None of these IP multicast routing protocols provide intrinsic end-to-end Quality of Service (QoS) guarantees. However, a limited IP Class of Service (CoS) mechanism does exist for the unicast model. The lack of end-to-end QoS capability from the IP layer leaves one to use lower layer protocols (e.g. ATM at layer 2), or to unnecessarily over-engineer the IP network for abundant/underutilized bandwidth between routers and switches to guarantee end-to-end QoS.

Over-engineering requires both links and routers (or switches) in the network to have excess bandwidth and routing capacity to handle peak traffic usage scenarios. To address the inherent inefficiency associated with over-engineering, statistical multiplexing models are used to share the over-engineered transport capacity among video channels.

While most unicast-based Internet applications are Unspecified Bit Rate (UBR)-based, broadcast entertainment video applications are mostly Constant Bit Rate (CBR)-based or Variable Bit Rate (VBR)-based. Many audio/video compression technologies, including MPEG2, can have a peak data rate much higher than the normal data rate. A high peak data rate occurs, for example, in a transition from a talking head with a simple background to a high-motion scene with a detailed background. Over-engineering without taking advantage of statistical multiplexing can quickly erode a price advantage that IP infrastructure brings to service providers.

Some small telcos are offering, for exploratory trial purposes, broadcast video services on their xDSL access network by expanding their unicast-centric network to support multicast. Some consider these solutions as being complicated, inflexible, difficult to expand, and cost ineffective. In these approaches, video content from satellite feeds and content servers in a head-end office is transported through switched legacy data networks to reach all video viewers. Because small telcos usually have smaller networks and smaller subscriber populations, their network normally has fewer element hop counts from the head-end to the CPEs and is easier to over-engineer. Over-engineering of larger telcos' networks, however, would not result in a feasible, scaleable, and cost-effective solution.

BRIEF DESCRIPTION OF THE DRAWINGS

The present invention is pointed out with particularity in the appended claims. However, other features are described in the following detailed description in conjunction with the accompanying drawing in which:

DETAILED DESCRIPTION OF THE DRAWINGS

Embodiments of the present invention provide network architectural changes and an associated control mechanism that allows Internet access providers to build a transport network for entertainment broadcast video with improved QoS and cost savings over the traditional IETF IP multicast proposals. The architecture includes an overlay broadcast network that co-exists with an existing legacy data network. The overlay broadcast network can use SONET technology or an alternative technology to unidirectionally transport broadcast video content. The associated control mechanism for transporting the broadcast video content is used in addition to existing mechanisms for the legacy data network.

Figure 1:
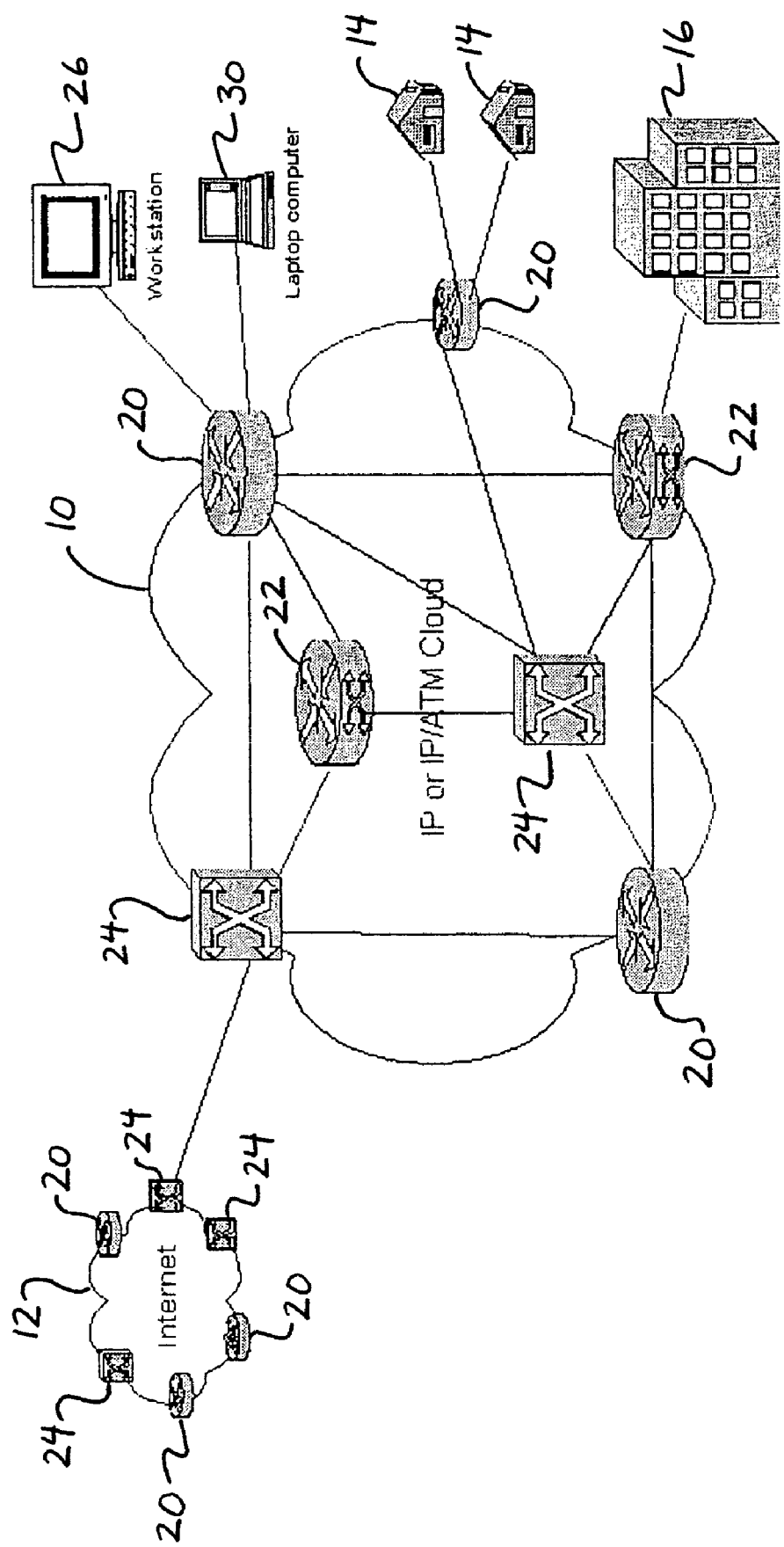
FIG. 1 is a simplified view of an Internet Protocol network.
Figure 2:
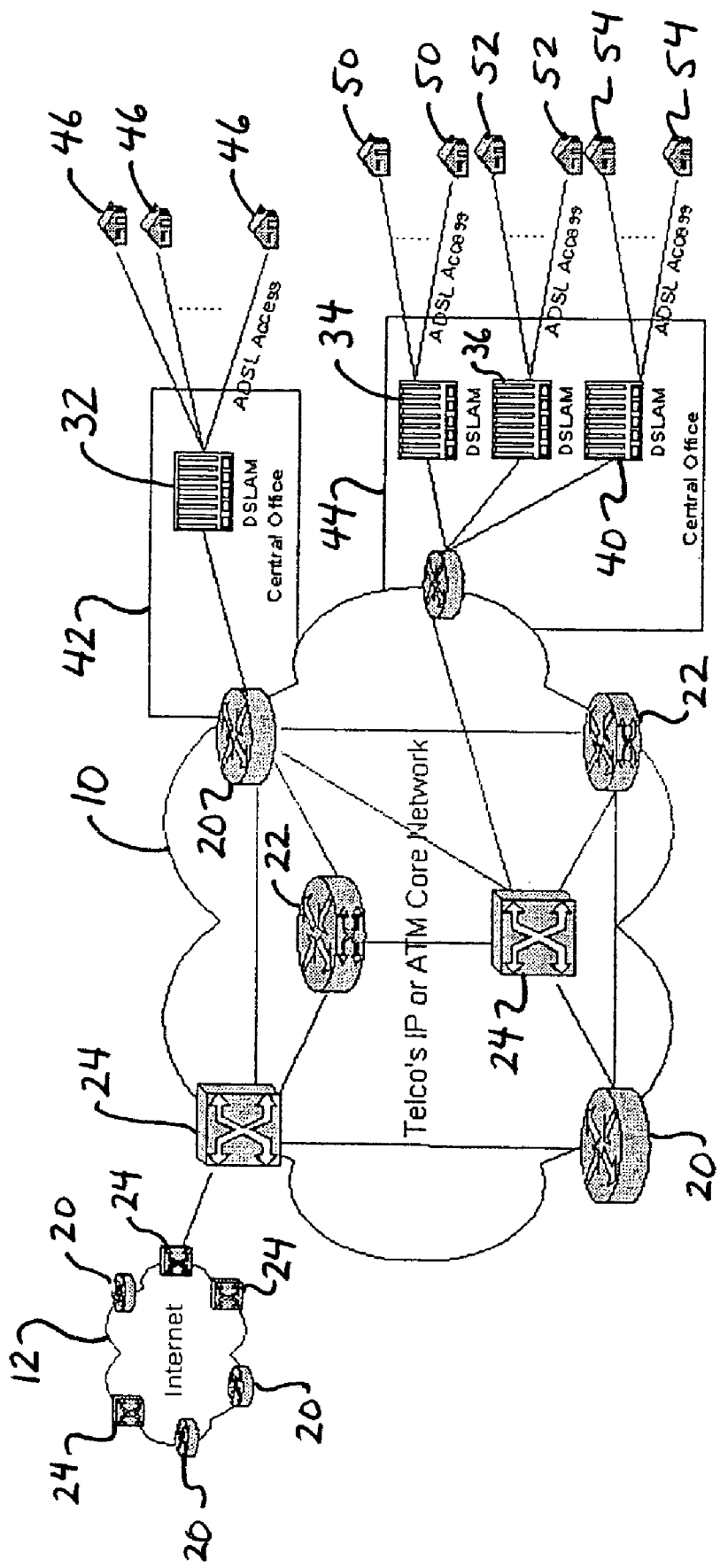
FIG. 2 shows placement of DSLAMs in relation to the IP network and the Internet.
Figure 3:
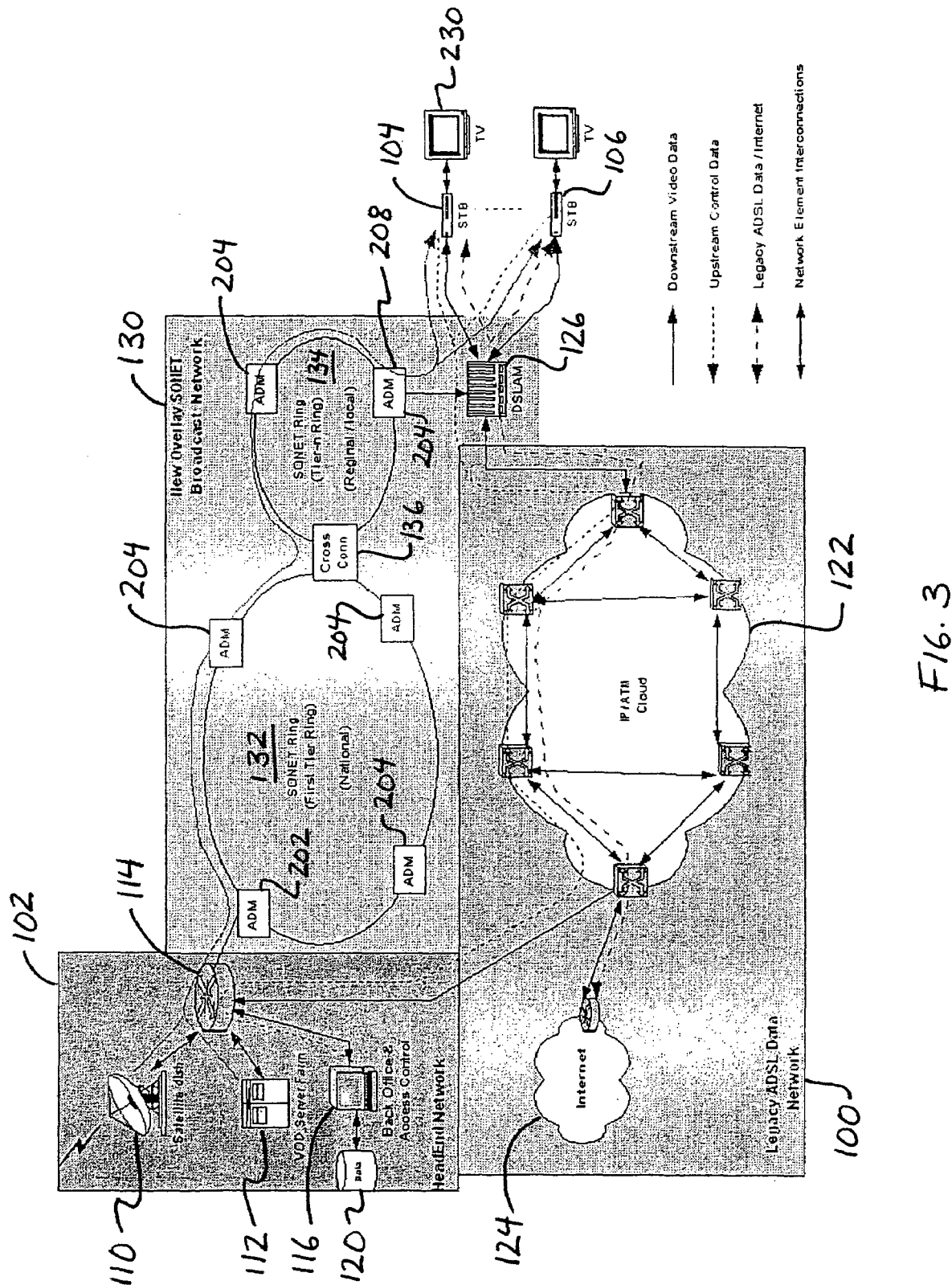
FIG. 3 is a schematic, block diagram of an embodiment of an architecture in accordance with the present invention.

FIG. 3 is a schematic, block diagram of an embodiment of an architecture in accordance with the present invention. A legacy data network 100 communicates interactive data exchanges between a head-end network 102 and multiple CPEs 104 and 106. Although two CPEs are illustrated, those having ordinary skill will appreciate that more than two CPEs can be served using the architecture.

The head-end network 102 comprises a satellite dish/receiver 110 and a video-on-demand (VOD) server farm 112 to provide video programming. The satellite dish/receiver 110 and the VOD server farm 112 are linked to a router 114 to provide network access to the video programming. The head-end network 102 may further comprise a computer 116 and a database 120 to provide back office and access control features.

The legacy data network 100 comprises an IP/ATM network 122 in communication with the head-end network 102 and the Internet 124. Carrier-side access to the IP/ATM network 122 is provided by a DSLAM 126. The legacy data network 100 comprises an existing unicast network, such as a legacy ADSL data network.

An overlay network 130 augments the legacy data network 100. Preferably, the overlay network 130 comprises a SONET network having at least one SONET ring. A multi-tiered SONET ring architecture can be used to enhance the coverage area for the overlay network, and/or to provide intra-LATA/inter-LATA coverage. For purposes of illustration and example, the overlay network 130 is depicted to comprise a first-tier SONET ring 132 and a tier-n SONET ring 134. The SONET rings 132 and 134 are connected by a cross connect element 136.

The SONET network is provisioned to carry only broadcast traffic from the head-end network 102 to the access networks. In contrast, the interactive data exchanges between the head-end network 102 and the access networks, which are easily accommodated using the unicast model, are carried by the legacy data network 100. The SONET network has improved performance of providing broadcast video from the head-end network 102 to the DSLAM 126.

Figure 4:
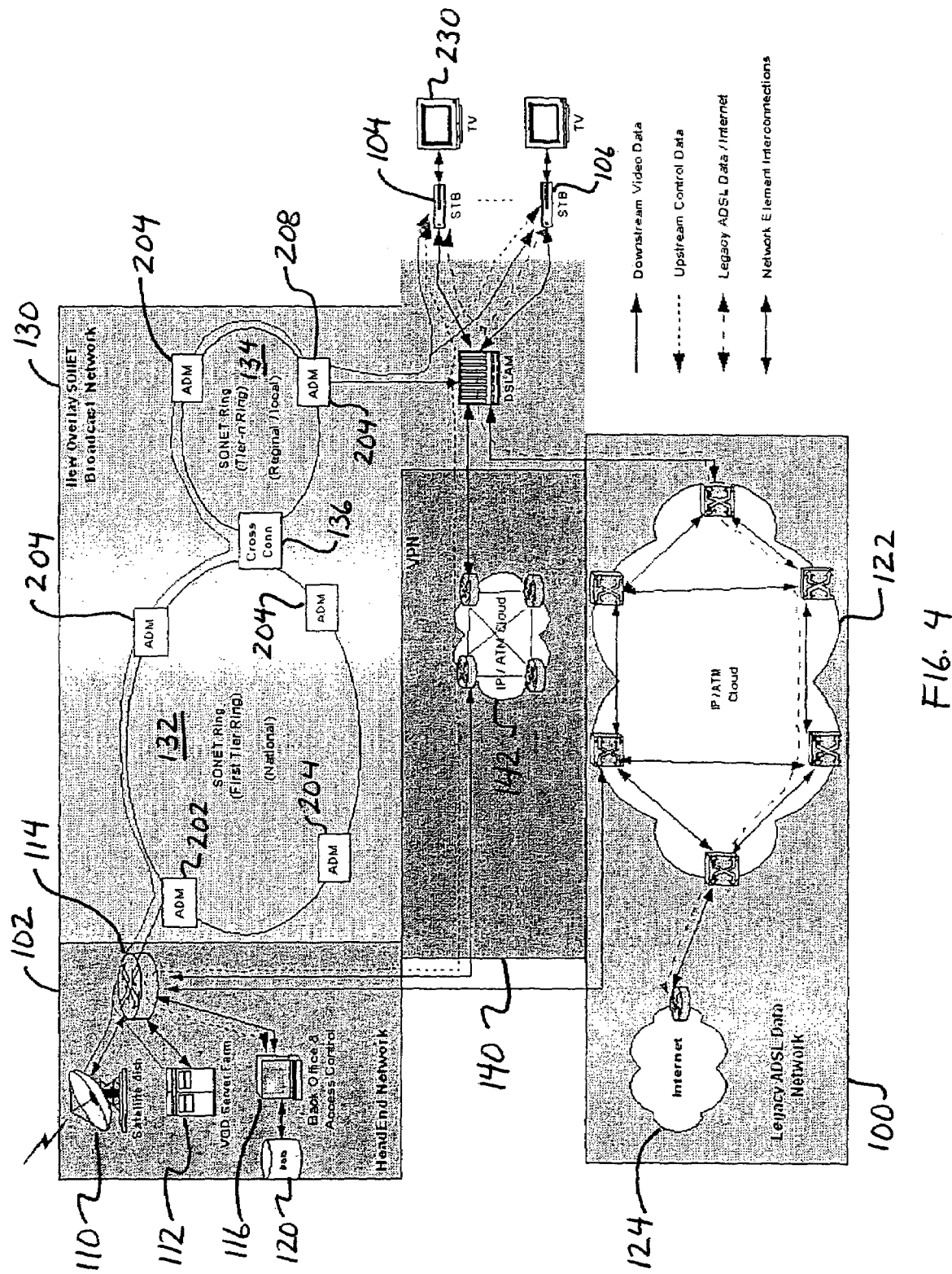
FIG. 4 is a schematic, block diagram of an enhancement to the embodiment of FIG. 3.

FIG. 4 is a schematic, block diagram of an enhancement to the embodiment of FIG. 3. In this embodiment, a dedicated separate data network 140 uses a unicast model to carry interactive data and control changes between the head-end network 102 and the access networks. Using the dedicated separate data network 140 instead of the legacy data network 100 improves the performance of interactive data and control exchanges. Examples of data that would be carried on the dedicated separate data network 140 include quality-sensitive applications such as exchanges to support interactive television and VOD.

In one embodiment, the dedicated separate data network 140 comprises a Virtual Private Network (VPN). The deployment of the VPN can be made using any VPN technology that provides the performance and QoS needed by a service provider. The VPN can be provided by an IP/ATM network 142.

Figure 5:
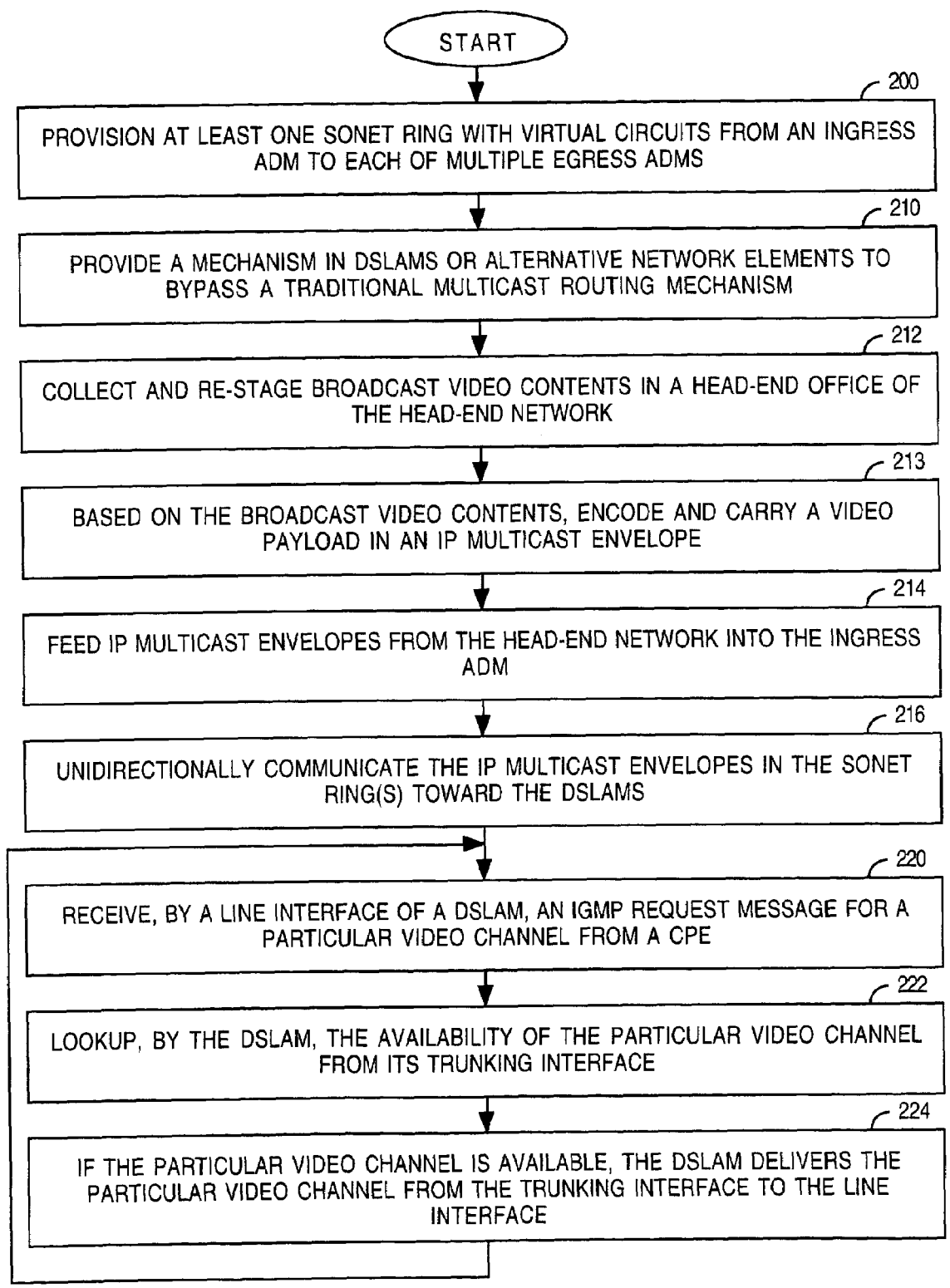
FIG. 5 is a flow chart of an embodiment of a method of providing broadcast video content using embodiments of the architecture.

FIG. 5 is a flow chart of an embodiment of a method of providing broadcast video content in accordance with the present invention. The method applies to the architectures of both FIG. 3 and FIG. 4 unless otherwise indicated.

As indicated by block 200, the method comprises provisioning at least one SONET ring, such as the SONET rings 132 and 134, with Virtual Circuits (VCs) from an ingress Add-Drop Multiplexer (ADM) 202 to each of multiple egress ADMs 204. This act can be performed using a suitable scheme such as Unidirectional Path-Switched Ring (UPSR). UPSR is an example of suitable use of network bandwidth in transporting unidirectional broadcast video to DSLAMs. Alternatively, a different scheme may be used as selected by the service provider.

The ingress ADM 202 is used to receive multiple broadcast video contents from the head-end network 102. The egress ADMs 204 are used to feed the broadcast video contents to DSLAMs, including the DSLAM 126, in the access network. An egress ADM 208 connects to a trunking interface (i.e. a network interface) of the DSLAM 126. Only one egress ADM is needed for a group of DSLAMs. If more than one DSLAM is in the group, the broadcast video data can be replicated using inexpensive IP layer-2 switches between the egress ADM and the receiving DSLAMs. Although optional, the aforementioned use of the layer-2 switch provides a cost saving approach for multi-DSLAM scenarios. If preferred, the service provider can use one egress ADM to one DSLAM.

As indicated by block 210, a mechanism is provided in the DSLAM 126 or alternative network element to bypass a traditional multicast routing mechanism and to provide a different way of multicast routing through the overlay network 130, such as through the SONET VC provisioning. The mechanism is able to recognize and to process IGMP requests received from the CPEs 104 and 106. The mechanism is further able to perform IP multicast switching based on both the IGMP requests and the multicast channel availability from the SONET egress port, such as the SONET egress ADM 208.

The point at which IGMP signaling and multicast routing meet is referred to herein as a "rendezvous point". Making the rendezvous point as close as possible to the CPE is beneficial. For most telcos' xDSL architectures, the DSLAM 126 is the preferred candidate to perform rendezvous point functions. Alternatively, other devices (e.g. a router) connected to the trunking interface of the DSLAM 126 can perform the rendezvous point functions.

Because the SONET rings 132 and 134 are provisioned for the delivery of unidirectional broadcast video, and video content is available at an egress ADM interface, the DSLAM 126 or alternative rendezvous point does not need to propagate the IGMP request to other IP multicast routing devices.

Thus, the act of providing the aforementioned mechanism can comprise adapting a DSLAM to perform the rendezvous point functions.

As indicated by block 212, broadcast video contents are collected and re-staged in a head-end office of the head-end network 102. The broadcast video contents can be encoded and compressed using any suitable technique, e.g. MPEG2.

Based on the broadcast video contents, a video payload is encoded and carried by and in an IP multicast envelope, as indicated by block 213. As indicated by block 214, the IP multicast envelope is fed from the head-end network 102 into the SONET ring ingress ADM 202.

As indicated by block 216, the broadcast video contents in the form of IP multicast envelopes are unidirectionally communicated in the SONET rings 132 and 134. The IP multicast envelopes are communicated from the SONET ring 132 to the SONET ring 134 by the cross connect element 136. The SONET rings 132 and 134 transport the broadcast video contents toward the DSLAM 126 and the CPEs 104 and 106.

Users of the CPEs 104 and 106 can select any of the broadcast video contents for view. In response to a user selection of a particular video channel, a CPE such as a set-top box generates an IGMP request message for the DSLAM 126. For purposes of illustration and example, consider the CPE 104 generating the IGMP request message.

As indicated by block 220, the DSLAM 126 receives the IGMP request message from its line interface. In response thereto, the DSLAM 126 looks up or otherwise determines the particular video channel's availability from its trunking interface based on a class-D IP address or a group address provided by the IGMP request message (block 222). If the particular video channel is available, the DSLAM 126 delivers the particular video channel from the trunking interface to its line interface (block 224).

The particular video channel is communicated from the line interface to the requesting CPE 104. The requesting CPE 104 receives the particular video channel, and decodes and renders video on a display device 230 for view by the user. Examples of the display device 230 include, but are not limited to, a television display and a computer display.

The aforementioned method ensures an immediate delivery of a broadcast channel and eliminates uncertainties, such as tree-building delays, lack of bandwidth, and unavailability of QoS, in dynamically building a multicast routing tree. Establishing such a tree would involve tree grafting and pruning based on channel request interests.

Figure 6:
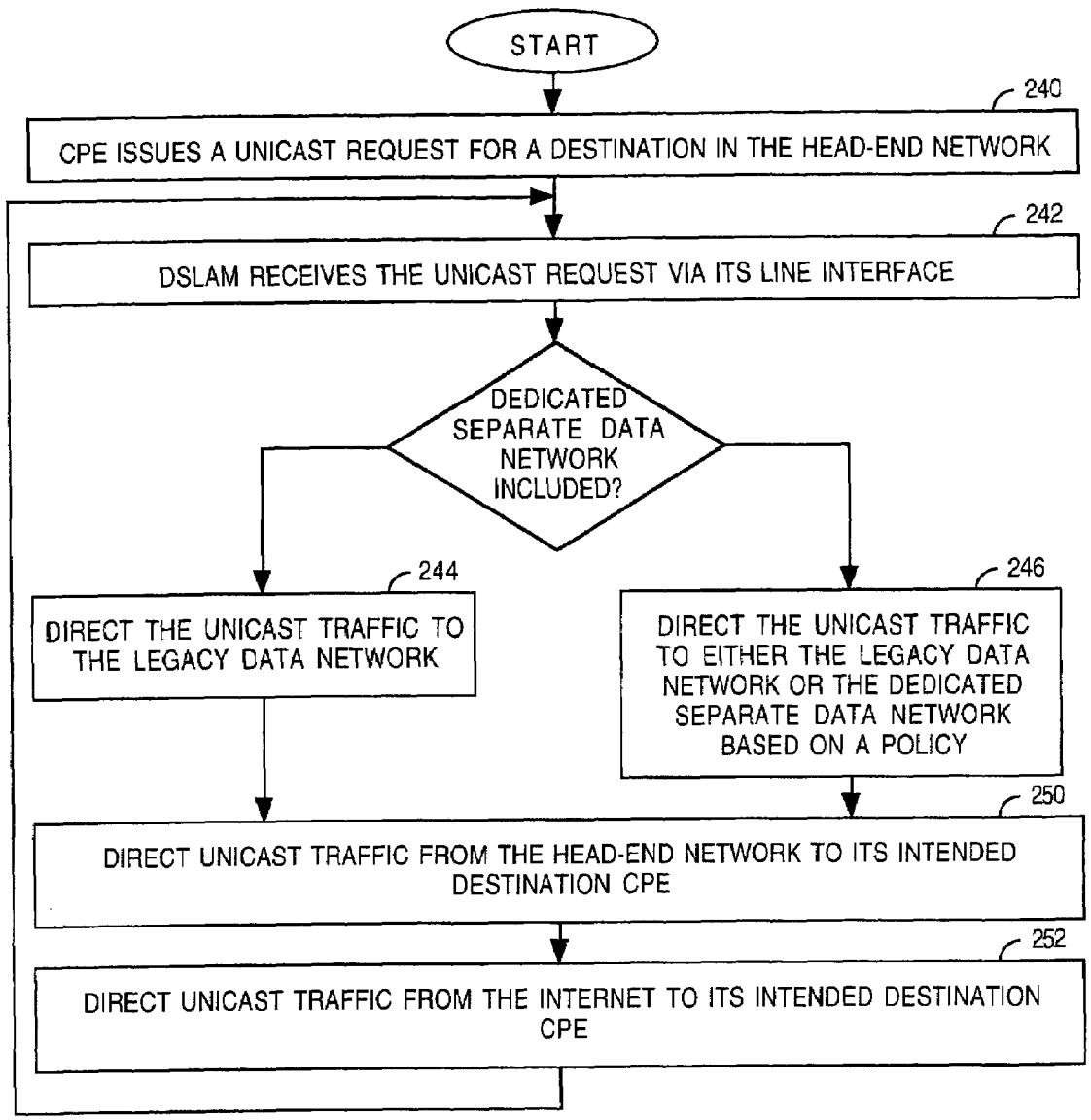
FIG. 6 is a flow chart of an embodiment of a method of transporting unicast interactions using embodiments of the architecture.

The CPEs 104 and 106 may need to send data to the head-end network 102 for interactions or for downloading an Electronic Program Guide (EPG), for example. Such data is well-suited for a unicast network, such as either the legacy data network 100 or the dedicated separate data network 140. FIG. 6 is a flow chart of an embodiment of a method of transporting unicast interactions between the CPEs 104 and 106 and the head-end network 102.

As indicated by block 240, a CPE such as the CPE 104 issues a unicast request for a destination in the head-end network 102. As indicated by block 242, the DSLAM 126 receives the unicast request via its line interface.

If the architecture is absent the dedicated separate data network 140 (such as the architecture of FIG. 3), the unicast traffic is directed to the legacy data network 100 (as indicated by block 244). The legacy data network 100 communicates the unicast traffic to the destination in the head-end network 102.

If the architecture includes the dedicated separate data network 140 (such as the architecture of FIG. 4), the DSLAM 126 decides whether the request should be directed (e.g. routed or switched) to the legacy data network 100 or the dedicated separate data network 140 (as indicated by block 246). The DSLAM 126 makes the decision based on its policy-based routing set-up. Either the legacy data network 100 or the dedicated separate data network 140 communicates the unicast traffic to the head-end network 102.

As indicated by block 250, the DSLAM 126 directs (e.g. routes or forwards) unicast traffic from the head-end network 102 to its intended destination CPE. The DSLAM 126 can receive the unicast traffic via either the legacy data network 100 or the dedicated separate data network 140. As indicated by block 252, the DSLAM 126 directs (e.g. routes or forwards) unicast traffic from the Internet 124 to its intended destination CPE without use of the enhanced multicast architecture.

The head-end network 102 may have its own routing policy to the Internet 124. Therefore, traffic from the head-end network 102 to the Internet 124 should find its own way to the Internet 124.

In summary, embodiments of the present invention introduce an overlay network dedicated for broadcast video delivery to avoid QoS complexity and to enhance QoS management. The overlay network can comprise a SONET broadcast overlay network provisioned as a unidirectional network. The core of the SONET broadcast overlay network uses a ring topology rather than a tree topology. DSLAMs are adapted to know that the SONET is provisioned as a unidirectional broadcast network. Policy-based mechanisms are built into the DSLAMs to understand that one or more overlay networks exist to serve different transport purposes. Accordingly, each DSLAM makes smart routing/switching decisions based on preset policies including but not limited to broadcast vs. unicast, address range, address group and application types.

Embodiments of the present invention have the following benefits.

1. Since the legacy data network 100 is left largely intact, no expensive network element upgrades are required therein. Since SONET is a cost effective technology, the overlay network 130 is cheaper to implement than expanding the legacy data network 100.

2. Neither over-engineering nor ATM/IP QoS interworking or tweaking are required in the legacy data network 100. Accordingly, there are fewer service disruptions.

3. The SONET technology is well-understood and widely deployed in and between the telco's central offices (COs). A greater synergy can be created by using an incumbent SONET infrastructure for transporting broadcast video and for other telco applications.

4. The SONET static service provisioning used for the overlay network 130 is simpler and more predictable than a dynamic IP-multicast tree pruning and grafting mechanism.

5. Since broadcast video applications are asymmetrical and only a unidirectional SONET VC is provisioned, any extra fiber bandwidth can be used either for redundancy protection or for increasing the broadcast service bandwidth.

6. Using the overlay network 130 to broadcast video channels does not adversely affect the performance of the legacy data network 100. Traffic fluctuations in the legacy data network 100, does not adversely affect the quality of video channels in the overlay network 130.

7. Since the channels are available from the trunking interface of the DSLAM, a channel surfing response time is fast.

It will be apparent to those skilled in the art that the disclosed embodiments may be modified in numerous ways and may assume many embodiments other than the forms specifically set out and described herein. For example, acts depicted in FIGS. 5 and 6 may be performed in an alternative order. In particular, the acts indicated by blocks 242, 244, 246, 250 and 252 should not be construed as being limited to the order depicted in FIG. 6.

Accordingly, the above disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A system comprising:
   a broadcast overlay network having a ring topology to carry traffic from a head-end network, the broadcast overlay network comprising a plurality of synchronous optical network (SONET) rings connected by at least one cross connect element, the plurality of SONET rings comprising an ingress Add-Drop multiplexer (ADM) to receive the broadcast traffic from the head-end network and a plurality of egress ADMs, the plurality of SONET rings comprising a first SONET ring and a second SONET ring, the first SONET ring having the ingress ADM;
   a dedicated data network separate from the broadcast overlay network and a legacy xDSL data network;
   a digital subscriber line access multiplexer (DSLAM) having a line interface and a network interface, the network interface in communication with one of the egress ADMs of the second SONET ring, the DSLAM to receive an Internet Group Management Protocol (IGMP) request message for a particular video channel from a customer premise via the line interface, to determine an availability of the particular video channel based on at least one of a group address and a class-D Internet Protocol (IP) address provided by the IGMP request, and to deliver the particular video channel from the network interface to the line interface;
   the DSLAM further to receive; from the customer premise via the line interface, a unicast request for a destination in the head-end network, and to deliver the unicast request to the dedicated data network; and
   the DSLAM further to receive from the head-end network via the dedicated data network, unicast traffic whose intended destination is the customer premise, and to direct the unicast traffic to the customer premise via the line interface.

2. The system of claim 1, wherein the ring topology only carries broadcast traffic.

3. The system of claim 1, wherein the DSLAM is further adapted to determine an availability of the particular video channel based on the group address provided by the IGMP request for the particular video channel.

4. The system of claim 1, wherein the DSLAM is further adapted to determine an availability of the particular video channel based on the class-D Internet Protocol (IP) address provided by the IGMP request.

5. The system of claim 1, wherein the second SONET ring includes at least one egress ADM.

6. The system of claim 1, wherein the traffic comprises Internet Protocol (IP) multicast envelopes.

7. The system of claim 1, wherein the dedicated data network is separate from the broadcast overlay network and separate from a legacy xDSL data network.

8. The system of claim 1, wherein the dedicated data network comprises a virtual private network (VPN).

9. The system of claim 1, wherein the DSLAM is further adapted to receive the unicast traffic via a legacy xDSL data network.

10. The system of claim 1, wherein the DSLAM is adapted to receive the unicast traffic via a dedicated data network separate from the broadcast overlay network and separate from a legacy xDSL data network.

11. The system of claim 1, wherein the unicast request is received from the customer premise via the line interface for a destination in the head-end network; and wherein the unicast request is delivered to a dedicated data network separate from the broadcast overlay network and separate from a legacy xDSL data network.

12. The system of claim 11, wherein the dedicated data network comprises a virtual private network (VPN).

13. The system of claim 1, wherein the unicast traffic is received via a dedicated data network separate from the broadcast overlay network and separate from a legacy data network.

14. The system of claim 2, wherein the traffic comprises Internet Protocol (IP) multicast envelopes.

15. The system of claim 2, wherein the dedicated data network comprises a virtual private network (VPN).

16. The system of claim 2, wherein the dedicated data network is separate from the broadcast overlay network and separate from a legacy xDSL data network.

* * * * *